(12) United States Patent
Zhang et al.

(10) Patent No.: US 12,012,521 B2
(45) Date of Patent: Jun. 18, 2024

(54) POLYMER MIXTURE, MULTILAYER ARTICLE CONTAINING THE SAME, AND PROCESS OF PREPARING THE MULTILAYER ARTICLE

(71) Applicant: Dow Global Technologies LLC, Midland, MI (US)

(72) Inventors: Liang Zhang, Shanghai (CN); Wei Li, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 151 days.

(21) Appl. No.: 17/772,390

(22) PCT Filed: Jan. 22, 2020

(86) PCT No.: PCT/CN2020/073735
§ 371 (c)(1),
(2) Date: Apr. 27, 2022

(87) PCT Pub. No.: WO2021/146987
PCT Pub. Date: Jul. 29, 2021

(65) Prior Publication Data
US 2022/0389234 A1    Dec. 8, 2022

(51) Int. Cl.
*C09D 7/65*      (2018.01)
*C09D 5/02*      (2006.01)
*C09D 7/40*      (2018.01)
*C09D 133/04*    (2006.01)

(52) U.S. Cl.
CPC ............. *C09D 5/022* (2013.01); *C09D 5/028* (2013.01); *C09D 7/65* (2018.01); *C09D 7/66* (2018.01); *C09D 7/70* (2018.01); *C09D 133/04* (2013.01)

(58) Field of Classification Search
CPC .................. C09K 11/025; C09K 11/06; C09K 2211/1007; C09K 2211/1014; C09K 2211/1018; H01G 9/20; H01L 31/0468; H01L 31/055; Y02E 10/52; C08F 220/06; C08F 220/14; C08F 220/1804; C08F 220/44; C08K 7/02; C08L 19/003; C08L 33/00; C08L 33/08; C08L 33/12; C08L 97/02; C09D 133/04; C09D 5/022; C09D 5/028; C09D 7/65; C09D 7/66; C09D 7/70

See application file for complete search history.

(56) References Cited

U.S. PATENT DOCUMENTS 7,501,475 B2    3/2009  Ootuka et al.
2010/0310893 A1 12/2010 Derbyshire et al.
(Continued)

FOREIGN PATENT DOCUMENTS

| AU | 2001272205 B2 | 11/2004 |
| BR | 200402485 A   | 4/2006  |
| BR | PI0718296 A2  | 11/2013 |

(Continued)

OTHER PUBLICATIONS

Extended European Search Report from corresponding application: 20915523.3 dated Sep. 18, 2023.
(Continued)

*Primary Examiner* — Lawrence D Ferguson (57) ABSTRACT

A novel polymer mixture having fast drying time, and good tensile strength and elongation at break properties, a multilayer article comprising a base layer made from the polymer mixture and a top layer, and a method of preparing the multilayer article.

8 Claims, 1 Drawing Sheet

(56) References Cited

U.S. PATENT DOCUMENTS

2016/0251507 A1  9/2016 Zhang et al.
2019/0153236 A1  5/2019 Li et al.

FOREIGN PATENT DOCUMENTS

| CA | 2921689 A1 | 9/2017 |
| CN | 1965047 A | 5/2007 |
| CN | 108264801 A | 7/2018 |
| CN | 108864799 A | 11/2018 |
| EP | 3636835 A1 | 4/2020 |
| WO | 2015051526 A1 | 4/2015 |
| WO | 2016101093 A1 | 6/2016 |

OTHER PUBLICATIONS

Office Action from corresponding Chinese Application: 202080093879.2 dated Aug. 14, 2023.

POLYMER MIXTURE, MULTILAYER ARTICLE CONTAINING THE SAME, AND PROCESS OF PREPARING THE MULTILAYER ARTICLE

FIELD OF THE INVENTION

The present invention relates to a polymer mixture and a multilayer article comprising the polymer mixture which has been dried, and a method of preparing the multilayer article.

INTRODUCTION

Synthetic sports track surfaces such as running track surfaces are typically made from a mixture of binder systems and rubber.

Sport track surfaces made from conventional two-component polyurethane binders are dominant in the market due to their satisfactory flexibility, wear-resistance, anti-slip property, and easy maintenance. These conventional two-component polyurethane binders usually comprise toluene diisocyanate (TDI) or methylene diphenyl diisocyanate, organic solvents, and/or heavy metal-containing catalysts, which may be toxic or environmentally unfriendly.

Compared to conventional two-component polyurethane binders, acrylic latex binders have much less environmental concerns. Acrylic latex binders may comprise multiple thin layers of acrylic binders, the thickness of each layer being typically less than 1 millimeter (mm). However, acrylic latex binders usually take too long to dry at room temperature, for example, at the temperature from 21° C. to 25° C., when thickly applied; thus, acrylic latex binders are rarely used in applications such as in running tracks or jogging tracks, whose surfaces typically have a thickness ≥13 mm.

Therefore, it is desirable to provide a novel polymer mixture that dries faster at room temperature than conventional acrylic latex-based compositions and is suitable for preparing synthetic sports track surfaces that have sufficient tensile strength, elongation at break and pull-off strength.

SUMMARY OF THE INVENTION

The present invention provides a novel polymer mixture of at least two acrylic emulsion (co)polymers having different glass transition temperature, vulcanized or crosslinked rubber and fibers selected from coconut shell fibers, wood fibers, or a mixture thereof. The polymer mixture of the present invention is substantially free of solvent and dries faster at room temperature than compositions comprising only conventional acrylic latex binders and rubber. The polymer mixture of the present invention demonstrates desirable tensile strength, elongation at break and drying speed properties.

The present invention further provides a multilayer article comprising a base layer made from the polymer mixture and a top layer. The multilayer article of the present invention demonstrates desirable tensile strength, elongation at break and pull-off strength properties.

In a first aspect, the present invention is a polymer mixture comprising an aqueous binder composition, vulcanized or crosslinked rubber and fibers,
wherein the aqueous binder composition comprises:
(a) a first acrylic emulsion (co)polymer having a glass transition temperature ($T_g$) of −5° C. or less,
(b) a second acrylic emulsion (co)polymer having a $T_g$ of at least 15° C., and
wherein the vulcanized or crosslinked rubber has a sieve particle size of from 1 mm to 4 mm, and the weight ratio of the total acrylic emulsion (co)polymers to the vulcanized or crosslinked rubber is from 1:7 to 1:2, and
wherein the fibers have a length of from 1 mm to 5 mm and an average diameter of from 5 microns to 10 mm, and are selected from coconut shell fibers, wood fibers, or a mixture thereof, and the weight ratio of the fibers to the vulcanized or crosslinked rubber is from 1:40 to 1:6.

In a second aspect, the present invention is a multilayer article comprising
(1) a base layer of a dried polymer mixture of the first aspect,
(2) a top layer of a dried aqueous top coating composition comprising an aqueous binder composition and vulcanized or crosslinked rubber.

In a third aspect, the present invention is a method of preparing the multilayer article of the second aspect. The method comprises:
(1) providing the polymer mixture of the first aspect;
(2) applying the polymer mixture to a substrate;
(3) drying and curing the polymer mixture to form a base layer;
(4) providing the aqueous top coating composition of the second aspect;
(5) applying the aqueous top coating composition to the base layer; and
(6) drying and curing the aqueous top coating composition to form a top layer, such that the base layer resides between the substrate and the top layer.

DETAILED DESCRIPTION OF THE INVENTION

The polymer mixture of the present invention comprises an aqueous binder composition, vulcanized or crosslinked rubber and fibers.

The aqueous binder composition useful in the present invention comprises (a) a first acrylic emulsion (co)polymer having a $T_g$ of −5° C. or less; and (b) a second acrylic emulsion (co)polymer having a $T_g$ of at least 15° C. The value of $T_g$ in the present invention is calculated according to the Fox Equation (T. G. Fox, Bull. Am. Phys. Soc. 1, 123 (1956)). The term "aqueous" herein means water or a mixture of water with 50 weight percent (wt %) or less of water-miscible solvent, based on the weight of the mixture. The term "acrylic" herein refers to (meth)acrylic acid, (meth)alkyl acrylate, (meth)acrylamide, (meth)acrylonitrile and modified forms thereof, for example, (meth)hydroxyalkyl acrylate. The term "(meth)acrylic" refers to any of acrylic, methacrylic, and mixtures thereof.

The first or second acrylic emulsion (co)polymer useful in the present invention may comprise one or more copolymerized ethylenically unsaturated nonionic monomers. "Nonionic monomers" herein refer to polymerizable monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, 1,3-butanediol dimethacrylate, and hydroxypropyl methacrylate; acrylamide; (meth)acrylonitrile; styrene and substituted styrene; or mixtures thereof. The ethylenically unsaturated nonionic monomers preferably comprise (meth)acrylic ester monomers, or their combination with styrene. In a preferred embodiment, the ethylenically unsaturated nonionic monomers comprise only (meth)acrylic ester monomers.

The first or second acrylic emulsion (co)polymer useful in the present invention may further comprise one or more copolymerized ethylenically unsaturated monomers having one or more functional groups. The functional groups may be selected from carbonyl, acetoacetate, alkoxysilane, carboxyl, ureido, amide, imide, amino group, or mixtures thereof. Preferably, an ethylenically unsaturated monomer bearing a carbonyl group such as diacetone acrylamide is used. Examples of suitable functional-group-containing ethylenically unsaturated monomers include ethylenically unsaturated carboxylic or dicarboxylic acids such as acrylic or methacrylic acid, itaconic acid, and maleic acid; amides, and preferably N-alkylolamides or hydroxyalkyl esters of the above-mentioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxy ethyl methacrylate, hydroxypropyl acrylate and hydroxypropyl methacrylate; or mixtures thereof.

The first or second acrylic emulsion (co)polymer useful in the present invention may comprise, based on the weight of the first or second acrylic emulsion (co)polymer respectively, 0.01 wt % or more of the copolymerized functional-group-containing ethylenically unsaturated monomer, 0.05 wt % or more, or even 0.1 wt % or more, and at the same time, 20 wt % or less, 10 wt % or less, or even 5 wt % or less.

In a preferred embodiment, the first and second emulsion acrylic (co)polymers each comprises, based on the weight of the first or second acrylic emulsion (co)polymer respectively, from 70 wt % to 99.5 wt % of the copolymerized ethylenically unsaturated nonionic monomer described above, and from 0.5 wt % to 10 wt % of the copolymerized ethylenically unsaturated monomers having one or more functional groups described above.

The first or second acrylic emulsion (co)polymer useful in the present invention may further comprise one or more copolymerized surfactants. The surfactants preferably bear an allyl group. Suitable commercially available surfactants include, for example, TREM LF-40 surfactant based on sodium alkyl allyl sulfosuccinate available from Cognis, ADEKA Resoap SR-10 reactive anionic emulsifier available from Adeka, DEXTROL OC-1525 surfactant based on ammonium phosphate ester nonyl phenol ethoxylate available from Dexter, LATEMUL PD-104 anionic polymerizable surfactant available from Kao Chemicals, HITENOL KH-10 anionic polymerizable surfactant available from Daiichi Kogyo Seiyaku Co., Ltd., or mixtures thereof.

The first or second acrylic emulsion (co)polymer useful in the present invention may comprise, based on the weight of the first or second acrylic emulsion (co)polymer respectively, 0.01 wt % or more of the copolymerized surfactant, 0.3 wt % or more, or even 0.5 wt % or more, and at the same time, 10 wt % or less, 5 wt % or less, or even 2 wt % or less.

The first or second acrylic emulsion (co)polymer useful in the present invention may further comprise a chain transfer agent. Examples of suitable chain transfer agents include 3-mercaptopropionic acid, dodecyl mercaptan, methyl 3-mercaptopropionate, benzenethiol, azelaic alkyl mercaptan, or mixtures thereof. When present, the concentration of the chain transfer agent may be, based on the weight of the first or second acrylic emulsion (co)polymer respectively, from 0.01 wt % to 20 wt %, from 0.1 wt % to 10 wt %, from 0.2 wt % to 2 wt %, or from 0.3 wt % to 1 wt %.

The first or second acrylic emulsion (co)polymer useful in the present invention may be prepared by emulsion polymerization known in the art. The first or second acrylic emulsion (co)polymer useful in the present invention may be in the form of an emulsion. The emulsion may have solids from 30 wt % to 70 wt %, from 35 wt % to 68 wt %, or from 40 wt % to 65 wt %, based on the total weight of the emulsion.

The first acrylic emulsion (co)polymer useful in the present invention may have a $T_g$ of $-5°$ C. or lower, $-6°$ C. or lower, $-8°$ C. or lower, or even $-10°$ C. or lower, and at the same time, $-50°$ C. or higher, $-45°$ C. or higher, or even $-40°$ C. or higher. Suitable commercially available first acrylic emulsion (co)polymer emulsions include, for example, ELASTENE™ 2848NG and RHOPLEX™ EC-2540 acrylic emulsions both available from The Dow Chemical Company (ELASTENE and RHOPLEX are trademarks of The Dow Chemical Company); or mixtures thereof.

The concentration of the first acrylic emulsion (co)polymer in the aqueous binder composition may be 5 wt % or more, 10 wt % or more, 15 wt % or more, or even 20 wt % or more, and at the same time, 95 wt % or less, 90 wt % or less, or even 80 wt % or less, based on the total weight of the acrylic emulsion (co)polymers in the aqueous binder composition.

The second acrylic emulsion (co)polymer may have a $T_g$ of at least $15°$ C., $18°$ C. or higher, or even $20°$ C. or higher, and at the same time, $60°$ C. or less, $50°$ C. or less, or even $40°$ C. or less. Suitable commercially available second acrylic emulsion (co)polymer emulsions include, for example, PRIMAL™ AC 261 P and PRIMAL TX-100 acrylic emulsions both available from The Dow Chemical Company (PRIMAL is a trademark of The Dow Chemical Company); or mixtures thereof.

The concentration of the second acrylic emulsion (co)polymer in the aqueous binder composition may be 5 wt % or more, 10 wt % or more, 15 wt % or more, or even 20 wt % or more, and at the same time, 95 wt % or less, 90 wt % or less, or even 80 wt % or less, based on the total weight of acrylic emulsion (co)polymers in the aqueous binder composition.

Total acrylic emulsion (co)polymers in the aqueous binder composition may be, based on the total weight of the aqueous binder composition, in an amount of 20 wt % or more, 30 wt % or more, or even 40 wt % or more, and at the same time, 70 wt % or less, 65 wt % or less, or even 60 wt % or less.

The aqueous binder composition useful in the present invention may further comprise a crosslinking agent. "Crosslinking agent" herein refers to a compound that has two or more reactive groups and that is capable of reacting with reactive groups attached to polymer chains to form crosslinks between polymer chains. The reactive groups on the crosslinking agent may be the same as or different from the reactive groups attached to the polymer chains.

The crosslinking agent useful in the present invention comprises a water-dispersible isocyanate composition. The water-dispersible isocyanate composition useful in the present invention may comprise an isocyanate compound and a modified isocyanate compound comprising at least one anionic group, at least one polyethylene oxide segment, or both an anionic group and a polyethylene oxide segment. In some embodiments, the water-dispersible isocyanate composition comprises the isocyanate compound, a modified isocyanate compound comprising the anionic group, and a modified compound comprising the polyethylene oxide segment. As used herein, an anionic group is a chemical group that carries negative charge. The negative charge may be −1, −2, or −3. A compound with an anionic group is associated with one or more cations. The associated cation may be a metal cation or an organic compound with a cationic group, a group having a positive charge of +1, +2, or +3. When a compound with an anionic group is in solid form or is in a nonpolar environment, the associated cation(s) is located adjacent to the anionic group. When such a compound is dissolved or dispersed in water, the anionic group and the associated cation(s) may be separated. Preferred anionic group is sulphonate, carboxylate, carboxylic acid group, phosphonate, or mixtures thereof. Suitable commercially available water-dispersible isocyanate compositions include, for example, BAYHYDUR XP2655 hydrophilic aliphatic polyisocyanate based on hexamethylene diisocyanate available from Bayer Material Science AG.

Preferably, the isocyanate compound in the water-dispersible isocyanate composition is a polyisocyanate compound having two or more isocyanate (NCO) groups. The polyisocyanate compound may be an aliphatic polyisocyanate, an aromatic polyisocyanate, or mixtures thereof. Examples of suitable aliphatic polyisocyanates are 1,6-hexamethylene diisocyanate (HDI), 1-isocyanato-3-isocyanatomethyl-3,5,5-trimethyl-cyclohexane (IPDI), 4,4'-diisocyanato dicyclohexylmethane ($H_{12}$MDI), di-isocyanatomethyl-cyclohexane (ADI), isomers thereof, polymers thereof, or mixtures thereof. The isocyanate compound is preferably an aromatic polyisocyanate. Examples of suitable aromatic polyisocyanates are toluylene-2,4-diisocyanate (2,4-TDI), toluylene-2,6-diisocyanate (2,6-TDI), naphthylene-1,5-diisocyanate, diphenylmethane-4,4'-diisocyanate (MDI), isomers thereof, polymers thereof, and mixtures thereof. Preferred polyisocyanate compounds comprise HDI trimer, polymeric MDI, or mixtures thereof "Polymeric MDI" herein refers to a mixture of diphenylmethane diisocyanate, and its oligomer or polymer.

The concentration of the isocyanate compound in the water-dispersible isocyanate composition may be, based on the total solids weight of the water-dispersible isocyanate composition, 1 wt % or more, 20 wt % or more, or even 50 wt % or more, and at the same time, 95 wt % or less, 90 wt % or less, or even 80 wt % or less.

In some embodiments, the modified isocyanate compound in the water-dispersible isocyanate composition may comprise one or more compounds having the structure of Formula (I):

A1-L1-(CH$_2$CH$_2$O)$_n$—Z   Formula (I)

wherein A1 has the following structure:

Formula (II)

L1 is a linking group formed by a reaction of an isocyanate group with an isocyanate-reactive group, n is 5 to 25, and Z is an alkyl group.

n may be 7 or more, or even 10 or more, and at the same time, 18 or less, or even 14 or less. Z may be linear, branched, cyclic, or a combination thereof. Z may be a linear or branched alkyl group having 1 to 8 carbon atoms, or 1 to 4 carbon atoms. Preferably, Z is methyl.

A1 is the residue of a diisocyanate trimer (a1). The diisocyanate trimer (a1) may be an aliphatic diisocyanate. Preferably, the diisocyanate trimer (a1) is HDI trimer, IPDI trimer, $H_{12}$MDI trimer, ADI trimer, or mixtures thereof. More preferably, the diisocyanate trimer (a1) is HDI trimer or ADI trimer.

L1 may be a urea group or a urethane group. Preferably, L1 is a urethane group. For example, when an isocyanate group reacts with a hydroxyl group or with an amine group, the resulting linking group L1 is a urethane group having the structure of Formula (III)-1 or a urea group having the structure of Formula (III)-2, respectively:

wherein $R^1$ is an organic group.

In some embodiments, the modified isocyanate compound in the water-dispersible isocyanate composition may comprise one or more compounds having the structure of Formula (IV):

A2-L2-Q-G   Formula (IV)

wherein residue A2 may be identical or different with A1, and A2 has the structure of Formula (II) as described above; L2 is a linking group formed by a reaction of an isocyanate group with an isocyanate-reactive group; Q is an organic group; and G is an anionic group.

L2 may be a urea group or a urethane group. Preferably, L2 is a urea group having the structure of Formula (III)-2. More preferably, L2 is a urea group having the structure of Formula (III)-2 wherein $R^1$ is an unsubstituted alkyl group, preferably an alkyl group having 4 to 8 carbon atoms, and more preferably cyclohexyl. Q may be an alkyl group that is linear, branched, cyclic, or a combination thereof. Preferably, Q is a linear alkyl group. More preferably, Q is —(CH$_2$)$_n$— wherein n is 1 to 8, and preferably n is 3. G may be sulfonate, carboxylate, a carboxylic acid group, or phosphonate. Preferably, G is sulfonate.

In a preferred embodiment, the water-dispersible isocyanate composition useful in the present invention comprises a mixture of the modified isocyanate compounds of Formula (I) and Formula (IV). The weight ratio of the modified isocyanate compound of Formula (I) to the modified isocyanate compound of Formula (IV) may be 0.01:1 or more, 0.25:1 or more, 0.43:1 or more, or even 0.67:1 or more, and at the same time, 100:1 or less, 4:1 or less, 2.3:1 or less, or even 1.5:1 or less.

The water-dispersible isocyanate composition useful in the present invention may be prepared according to any known methods. The method of preparing the water-dispersible isocyanate composition may comprise reacting an isocyanate compound with an anionic compound and/or a non-ionic compound. Examples of suitable isocyanate compounds for preparing the water-dispersible isocyanate composition include those isocyanate compounds described above in the water-dispersible isocyanate composition. The anionic compound may comprise the anionic group described above. The non-ionic compound may comprise the polyethylene oxide segment described above. In a preferred embodiment, the water-dispersible isocyanate composition is prepared by reacting the non-ionic and/or anionic compound with a first isocyanate compound, then mixing the resultant modified isocyanate with a second isocyanate compound. The first isocyanate compound and the second isocyanate compound may be the same or different.

In a preferred embodiment, the crosslinking agent in the aqueous binder composition further comprises one or more epoxy silanes. Surprisingly, the combination of the epoxy silane and the water-dispersible isocyanate composition can further improve the water resistance property of the resultant cured polymer mixture. An epoxy silane means a functional silane having at least one epoxy group. A preferred epoxy silane has the structure of Formula (V):

Formula (V)

wherein $R^2$ is an alkyl group having 1 to 6 carbon atoms; $R^3$ is a bivalent organic group having a molecular weight of 200 or less; $R^4$ is a hydrogen atom or an alkyl, aryl, or aralkyl group having 1 to 20 carbon atoms; and m is 1, 2 or 3.

Examples of suitable epoxy silanes include 3-glycidoxypropyltrimethoxysilane; 3-glycidoxypropylmethyldiethoxysilane; 3-glycidoxypropyltriethoxysilane; beta-(3,4-epoxycyclohexyl)ethyltriethoxysilane; or mixtures thereof. Suitable commercially available epoxy silanes include, for example, SILQUEST A-187, SILQUEST WetLink 78, SILQUEST A-186, and COATOSIL 2287 epoxy silanes all available from Momentive Performance Materials; or mixtures thereof. When the epoxy silane is used, the weight ratio of the water-dispersible isocyanate composition to the epoxy silane may be 0.1:1 or more, 0.5:1 or more, or even 1.5:1 or more; and at the same time, 10:1 or less, 5:1 or less, or even 2.5:1 or less.

The concentration of total crosslinking agents in the aqueous binder composition may be, based on the total weight of the acrylic emulsion (co)polymers, 1 wt % or more, 2 wt % or more, or even 3 wt % or more, and at the same time, 20 wt % or less, 15 wt % or less, or even 8 wt % or less.

The aqueous binder composition useful in the present invention may further comprise one or more defoamers. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, NOPCO NXZ metallic soap type defoamer, TEGO Airex 902 W and TEGO Foamex 1488 polyether siloxane copolymer emulsions both available from TEGO, BYK-024 silicone defoamer available from BYK, or mixtures thereof. When present, the concentration of the defoamer may be, based on the total weight of the aqueous binder composition, from 0.01 wt % to 1 wt %, from 0.05 wt % to 0.8 wt %, or from 0.1 wt % to 0.3 wt %.

The aqueous binder composition useful in the present invention may further comprise one or more thickeners. The thickeners may be polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W nonionic rheology modifier available from The Dow Chemical Company (ACRYSOL is a trademark of The Dow Chemical Company). When present, the concentration of the thickener may be, based on the total weight of the aqueous binder composition, from 0.01 wt % to 3 wt %, from 0.05 wt % to 2 wt %, or from 0.1 wt % to 0.3 wt %.

The aqueous binder composition useful in the present invention may further comprise water. The concentration of water may be, based on the total weight of the aqueous binder composition, from 10 wt % to 90 wt %, from 20 wt % to 80 wt %, or from 30 wt % to 70 wt %.

In addition to the components described above, the aqueous binder composition useful in the present invention may further comprise any one or combination of the following additives: inorganic extenders, pigments, fillers, coalescing agents, cosolvents, buffers, neutralizers, dispersants, humectants, mildewcides, biocides, anti-skinning agents, colorants, flowing agents, anti-oxidants, plasticizers, leveling agents, dispersants, adhesion promoters, diluents and grind vehicles. When present, these additives may be in an amount of from 0.001 wt % to 10 wt %, or from 0.01 wt % to 2 wt %, based on the total weight of the aqueous binder composition.

The polymer mixture of the present invention further comprises vulcanized or crosslinked rubber. Examples of suitable vulcanized or crosslinked rubber useful in the present invention comprise styrene butadiene rubber (SBR), ethylene-propylene-diene monomer (EPDM) rubber, ethylene propylene rubber, butadiene rubber, natural rubber, styrene butadiene copolymer, hydrogenated nitrile, nitrile rubber, neoprene, polychloroprene, ground tire rubber (GTR), waste rubber, waste rubber vulcanizate, or mixtures thereof. Preferably, waste vulcanized or crosslinked rubber is used; such waste rubber may come from any known sources, such as, for example, tires, shoe soles, and ground tire rubber.

The vulcanized or crosslinked rubber useful in the present invention may have a sieve particle size of 1 mm or more, 1.5 mm or more, 2 mm or more, or even 2.5 mm or more, and at the same time, 4 mm or less, 3.5 mm or less, or even 3 mm or less.

The weight ratio of the total acrylic emulsion (co)polymers to the vulcanized or crosslinked rubber in the polymer mixture of the present invention may be 1:2 or lower, 1:3.5 or lower, or even 1:3.9 or lower, and the same time, 1:7 or higher, 1:6 or higher, or even 1:4.3 or higher. When acrylic emulsion (co)polymer latexes are used, the weight ratio herein refers to the weight ratio of solids of the latexes to the vulcanized or crosslinked rubber.

The polymer mixture of the present invention further comprises fibers selected from coconut shell fibers, wood fibers, or a mixture thereof.

The fibers useful of the present invention are commonly 1 mm to 5 mm in length and 5 microns to 10 mm in average diameter. Preferably, the fibers are 0.5 mm to 5 mm in average diameter.

The term "average diameter" herein means a calculated diameter d given by the equation:

$$d = 2\sqrt{\frac{V/L}{\pi}}$$

where V is the volume of a fiber; L is the length of the fiber; and π is the circular constant (pi). One of the common methods known to the person skilled in the art to calculate the volume of a fiber V is as follows:

$$V = m/\pi$$

where m is the mass of the fiber and p is the density of the fiber.

The common name, scientific name and plant family of coconut shell fiber is coir, *Cocos nucifera* and arecaceae (palm), respectively. There are two types of coconut shell fibers, brown fibers extracted from matured coconuts and white fibers extracted from immature coconuts. Coconut shell fibers can be extracted from the outer shell of coconuts by using fiber extraction machines. Brown fibers are thick, strong and have high abrasion resistance. White fibers are smoother and finer, but also weaker.

Coconut shell fibers are commercially available in three forms, namely bristle, mattress and decorticated fibers. The bristle fiber consists of longer coarser fibers from the husk of coconuts, and the mattress fiber consists of shorter finer fibers from the husk of coconuts. The decorticated fiber is a mixed fiber of the bristle fiber and the mattress fiber and looks very much like the mattress fiber but is cleaner and much stronger because in this case the bristle fiber has not been separated. These different types of fibers have different usage depending upon the requirement. In engineering, brown fibers are mostly used.

Wood fibers, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the present invention, additional fiber make-up can be derived from a number of secondary or fiber reclaim sources including bamboo, rice, sugar cane, and recycled fibers from newspapers, boxes, computer printouts, etc.

Examples of suitable wood fiber include the wood fiber by-product of sawing or milling soft woods commonly known as sawdust or milling tailings. Such wood fiber has a regular reproducible shape and aspect ratio.

Examples of the preferred wood fiber for use in the present invention are fibers derived from processes common in the manufacture of windows and doors. Wooden members are commonly ripped or sawed to size in a cross-grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions.

The weight ratio of the fibers to the vulcanized or crosslinked rubber in the polymer mixture of the present invention may be 1:6 or lower, 1:7.5 or lower, or even 1:26 or lower, and at the same time, 1:40 or higher, 1:35 or higher, or even 1:30 or higher.

The polymer mixture of the present invention may be obtained by firstly preparing the aqueous binder composition, and then mixing it with the vulcanized or crosslinked rubber and the fibers. The aqueous binder composition may be supplied in two parts: the first and second acrylic emulsion (co)polymers, and optionally additional components such as the thickener and defoamer usually form "Part A"; and the crosslinking agent comprising the water-dispersible isocyanate composition usually forms "Part B". When used, the epoxy silane may be present in Part A and/or Part B. The polymer mixture of the present invention may be prepared by mixing Part A and Part B to form the aqueous binder composition, then mixing with the vulcanized or crosslinked rubber and the fibers.

Surprisingly, the polymer mixture the present invention dries at room temperature much faster than a polymer mixture containing no fiber.

The polymer mixture of the present invention may be cured at a temperature of generally from 5° C. to 80° C., from 10° C. to 50° C., from 15° C. to 40° C., or from 20° C. to 35° C. The time of curing the polymer mixture may be chosen between 30 minutes to 24 hours, between 1 hour to 20 hours, or between 2 hours to 10 hours. It is also operable to partially cure the polymer mixture and then complete the curing process at a later time.

The multilayer article of the present invention may comprise a based layer made from the polymer mixture of the present invention, and a top layer made from an aqueous top coating composition. The aqueous top coating comprises an aqueous binder composition and vulcanized or crosslinked rubber. Examples of suitable aqueous binder composition and vulcanized or crosslinked rubber are as described in the polymer mixture above suitable for the base layer as well. The aqueous top coating composition preferably comprises the defoamer, the thickener, the pigment described above, or mixtures thereof. The vulcanized or crosslinked rubber in the aqueous top coating composition is preferably EPDM rubber.

In the base layer of the multilayer article of the present invention, the weight ratio of the total acrylic emulsion (co)polymers to the vulcanized or crosslinked rubber may be 1:2 or lower, 1:3.5 or lower, or even 1:3.9 or lower, and at the same time, 1:7 or higher, 1:6 or higher, or even 1:4.3 or higher, and the weight ratio of the fibers to the vulcanized or crosslinked rubber may be 1:6 or lower, 1:7.5 or lower, or even 1:26 or lower, and at the same time, 1:40 or higher, 1:35 or higher, or even 1:30 or higher. The vulcanized or crosslinked rubber in the base layer may have a sieve particle size of 1 mm or more, 1.5 mm or more, 2 mm or more, or even 2.5 mm or more, and at the same time, 4 mm or less, 3.5 mm or less, or even 3 mm or less. The vulcanized or crosslinked rubber in the base layer is preferably waste vulcanized or crosslinked rubber. The fibers in the base layer may have a length of from 1 mm to 5 mm and an average diameter of from 5 microns to 10 mm.

In the top layer of the multilayer article of the present invention, the weight ratio of the total acrylic emulsion (co)polymers to the EPDM rubber or the vulcanized or crosslinked rubber may be 1:0.5 or lower, 1:1 or lower, 1:2 or lower, or even 1:2.5 or lower, and at the same time, 1:4 or higher, 1:3.5 or higher, or even 1:3 or higher. The EPDM rubber or the vulcanized or crosslinked rubber in the top layer may have a sieve particle size of 1 mm or more, 1.5 mm or more, 2 mm or more, or even 2.5 mm or more, and at the same time, 4 mm or less, 3.5 mm or less, or even 3 mm or less.

The multilayer article of the present invention may further comprise a primer layer, such that the base layer resides between the top layer and the primer layer. The primer layer may be used to further improve the adhesion of the multilayer article to a substrate. The primer layer may be made from an aqueous primer composition.

The aqueous primer composition useful in the present invention may comprise the first acrylic emulsion (co) polymer described above, the second acrylic emulsion (co) polymer described above, or mixtures thereof. The aqueous primer composition may further comprise the epoxy silane described above to further improve adhesion of the resultant multilayer article to a substrate under wet conditions. The aqueous primer composition may also comprise the water-dispersible isocyanate composition described above. In a preferred embodiment, the aqueous primer composition comprises the first and second acrylic emulsion (co)polymers, the epoxy silane, the water-dispersible isocyanate composition, and optionally the defoamer. Concentration of the above components in the aqueous primer composition may have the same ranges described above as they are in the aqueous binder composition.

The multilayer article of the present invention may further comprise other functional layers. For example, the multilayer article may further comprise a protective layer, so that the top layer resides between the protective layer and the base layer. The presence of the protective layer may be useful to further improve abrasion resistance and aging resistance of the multilayer article.

The multilayer article of the present invention may have a thickness of at least 10 mm, 12 mm or more, or even 13 mm or more. The volume ratio of the base layer to the multilayer article may be from 40% to 95%, from 50% to 90%, or from 70% to 80%, and the volume ratio of the top layer to the multilayer article may be from 5% to 60%, from 10% to 40%, or from 20 to 30%.

The method of preparing the multilayer article of the present invention comprise:
(1) providing the polymer mixture of the present invention wherein the weight ratio of the total acrylic emulsion (co)polymers to the vulcanized or crosslinked rubber is from 1:7 to 1:2, and wherein the weight ratio of the fibers to the vulcanized or crosslinked rubber is from 1:40 to 1:6; (2) applying the polymer mixture to a substrate; (3) drying and curing the polymer mixture to form the base layer; (4) providing the top coating composition of the present invention wherein the weight ratio of total acrylic emulsion (co)polymers to the vulcanized or crosslinked rubber is from 1:0.5 to 1:4; (5) applying the top coating composition to the base layer; and (6) drying and curing the top coating composition to form the top layer, such that the base layer resides between the substrate and the top layer.

In preparing the multilayer article, the polymer mixture or the top coating composition of the present invention can be applied to the substrate or to the base layer, respectively, by any known methods, for example, manual troweling or machine applying using conventional equipment such as TPJ-2.5 type synthetic running track paver. The obtained surface may be further smoothed by troweling. Preferably, the top coating composition is applied to the base layer by spraying. The substrate can be any substrate including, for example, concrete, bitumen, metal, or wood. Preferably, the substrate is primed by an aqueous primer composition described above before applying the polymer mixture of the present invention.

In preparing the multilayer article, drying and curing the polymer mixture and the top coating composition of the present invention may be carried out at a predetermined temperature and for a predetermined period of time sufficient to evaporate water. Drying and curing may be conducted at ambient temperature, for example, a temperature of from 5° C. to 50° C., from 15° C. to 40° C., or from 20° C. to 30° C. The time of drying and curing the polymer mixture and the top coating composition may depend on various factors including, for example, thickness of the polymer mixture or the top coating composition applied to the substrate or to the based layer, and outdoor conditions such as temperature, relative humidity and wind. For example, the time for drying and curing the polymer mixture and the top coating composition may be chosen between 1 minute to 24 hours, between 5 minutes to 12 hours, between 20 minutes to 8 hours, or between 30 minutes to 6 hours.

The method of preparing the multilayer article of the present invention can be conducted in a fairly short time due to the fast-drying speed of the polymer mixture of the present invention. The time period between the application of the polymer mixture to the substrate and the application of the top coating composition to the base layer may be various, for example, the time can be 8 hours or less, 6 hours or less, or even 5 hours or less, and at the same time, 2 hours or more, 2.5 hours or more, or even 3 hours or more.

The method of preparing the multilayer article of the present invention may further comprise: applying the aqueous primer composition to the substrate to form a primer layer before applying the polymer mixture of the present invention to the substrate to form the base layer and applying the top coating composition to the base layer to form the top layer.

The method of preparing the multilayer article is substantially free of solvent since little or no solvents were used in the process of making the multilayer article. The method can be conducted at a shorter time than a polymer mixture containing no fiber.

The multilayer article of the present invention may be used in various applications, for example, sound proofing materials, acoustic underlayment, flooring underlayment and matting, industrial and sports utilities such as artificial track and playground surfaces, mats and pads, ball cores, and consumer products such as floor tiles, covers, molded products, and in road paving and maintenance applications. In particular, the multilayer article is suitable for use as water-permeable running track surfaces. "Water-permeable running track surfaces" herein refers to a synthetic track surface material made of rubber particles bonded by a resin binder and having have voids between rubber particles, that not only allows surface water runoff, but also allows water to percolate through the surface material.

Figure 1:
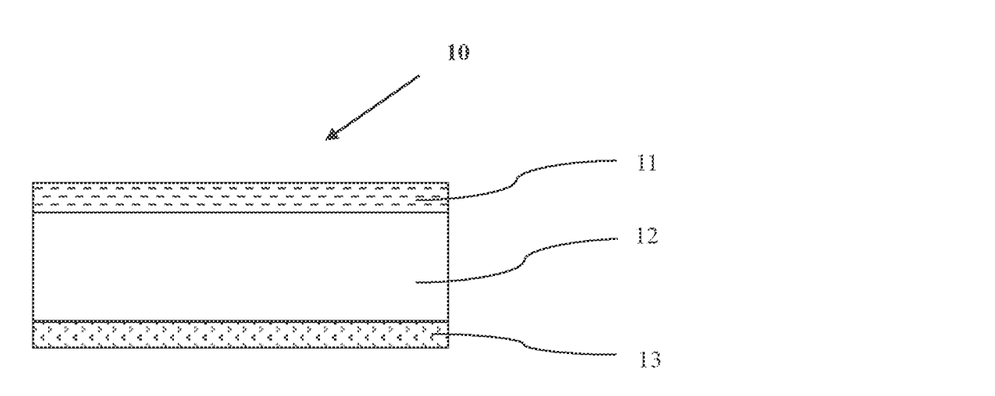
FIG. 1 is a schematic illustration of a cross section of one embodiment of the present invention.

Desirable embodiments of the present invention include a multilayer structure. With reference to FIG. 1, there is shown a schematic perspective view of one embodiment of a multilayer article of the present invention 10 comprising top layer 11, base layer 12, primer layer 13 and optionally one or more other layers therebetween. Each layer comprises two opposing primary surfaces. Top layer 11 contacts one primary surface of base layer 12 and primer layer 13 contacts the opposing primary surface of base layer 12, so that base layer 12 resides between top layer 11 and primer layer 13. An optional protective layer (not shown) may be applied on one primary surface of top layer 11, so that top layer 11 resides between the protective layer and base layer 12. Generally, the thickness of the base layer may be 6 mm or more, 7 mm or more, or even 8 mm or more, and at the same time, 16 mm or less, 15 mm or less, or even 14 mm or less. The thickness of the top layer may be generally 1 mm or more, 1.5 mm or more, or even 2 mm or more, and at the same time, 5 mm or less, 4 mm or less, or even 3 mm or less. If present, the primer layer may generally have a thickness in the range of from 50 microns to 500 microns, from 75 microns to 400 microns, or from 100 microns to 300 microns.

EXAMPLES

I. Raw Materials Used

Some Embodiments of the Invention Will Now be Described in the Following Examples, wherein all parts and percentages are by weight unless otherwise specified. The following materials and abbreviations are used in the examples:

"AA" stands for acrylic acid.
"MAA" stands for methacrylic acid.
"BA" stands for butyl acrylate.
"MMA" stands for methyl meth-acrylate.
"AN" stands for acrylonitrile.

| Acrylic Polymer Composition | $T_g$ | MFFT | pH value | Solids |
|---|---|---|---|---|
| Polymer 1 latex* | 45BA/52MMA/1MAA/2 Ureido adhesion promoter | 24° C. | 18° C. | 9.5 (±0.5) | 50% |
| Polymer 2 latex* | 1.4 AA/6.9 AN/86.3 BA/5.4 additives | −35° C. | <1° C. | 7.5 | 61% |

*The latexes are all available from The Dow Chemical Company.
$T_g$ is determined by the Fox Equation as described by Fox in Bulletin of the American Physical Society, 1, 123 (1956).
"MFFT" refers to Minimum Film Formation Temperature and is measured according to ASTM D2354-10.

NOPCO NXZ defoamer, available from Henkel, is a metallic soap type defoamer.

ACRYSOL™ RM-8W thickener, available from The Dow Chemical Company, is a nonionic urethane thickener.

POLYOX™ WSR301 resin, available from The Dow Chemical Company, is a water-soluble polyethylene oxide (PEO) resin and is used as a lubricant (POLYOX is a trademark of The Dow Chemical Company).

BAYHYDUR XP2655E water-dispersible polyisocyanate, available from Bayer Material Science AG, is a hydrophilic aliphatic polyisocyanate based on hexamethylene diisocyanate (HDI) and is used as a crosslinking agent.

COATOSIL 2287 epoxy functional silane, available from Momentive Performance Materials Inc., is 3-glycidoxypropylmethyldiethoxy silane and is used as a crosslinking agent.

Black waste tire rubber particles have a sieve particle size of 1 mm to 3 mm and are available from Shanghai Terra Engineering & Industry Co., Ltd.

Black waste tire rubber particles have a sieve particle size of 2 mm to 4 mm and are available from Shanghai Terra Engineering & Industry Co., Ltd.

EPDM rubber particles have a sieve particle size of 1 mm to 3 mm and are available from Guangzhou Chuanao Sports Facilities Co., Ltd.

Coconut shell fibers have a length of 1 mm to 2 mm and an average diameter of 1 mm to 5 mm and are available from KNAAP (Thailand) Co., Ltd. in Thailand.

Coconut shell fibers have a length of 2 mm to 5 mm and an average diameter of 1 mm to 5 mm and are available from KNAAP (Thailand) Co., Ltd. in Thailand.

Wood fibers have a length of 1 mm to 2 mm and an average diameter of 1 mm to 5 mm and are available from Hebei Lingshou Xingyuan Powder Factory.

Wood fibers have a length of 2 mm to 5 mm and an average diameter of 1 mm to 5 mm and are available from Hebei Lingshou Xingyuan Powder Factory.

II. Test Methods

The following standard analytical equipment and methods are used in the examples.

1. Tensile Strength and Elongation at Break Properties

Tensile strength and elongation at break properties of a layer or a running track sample are evaluated according to item 5.4, page 3, the GB/T 14833-2011 standard. Higher values are usually indicative of greater durability.

A tensile strength greater than 0.09 megapascal (MPa) is desired for the base layer of this invention and a tensile strength greater than 0.18 MPa is desired for the sports track of this invention. Otherwise, it fails the tensile strength requirement.

An elongation at break greater than 10% is desired for the base layer of this invention and an elongation at break great than 15% is desired for the running track of this invention. Otherwise, it fails the elongation at break requirement.

2. Drying Residual Ratio

Drying residual ratio property of a base layer is quantified by the percentage of the residue of the base layer remaining on release paper after peeling off the base layer from the release paper after 4 hours. The process is (1) applying a polymer mixture on release paper to form a based layer; (2) peeling the base layer off the release paper after 4 hours; (3) measuring the percentage of the residue of the base layer on the release paper. Lower values are usually indicative of higher drying speed.

A drying residual ratio lower than 85% is desired for the based layer of this invention.

3. Pull-Off Strength at Break

Pull-off strength at break property of a multilayer article comprising a base layer and a top layer is quantified by the pull-off strength when the base layer and the top layer separate from each other or either layer separate into two parts. The process is (1) cutting a dried multilayer article comprising a base layer and a top layer to a 5 centimeters (cm)×5 cm square piece; (2) bonding the base layer side on a concrete slab by epoxy adhesive; (3) bonding a steel block on the top layer by epoxy adhesive; (4) testing pull-off strength by the bond strength testing system HP 1000 at 50 newton/second until break. Higher values are usually indicative of greater durability.

Pull-off strength at break greater than 0.1 MPa is desired for the sports track of this invention.

III. Examples

1. Preparation of Base Layer Samples and Sports Track Samples

Example (Ex) 1

Binder-1 was prepared by first mixing Part A and Part B, and then mixing with the waste tire rubber particles and the fibers based on the formulation described in Table 1. The resultant first polymer mixture was then casted onto a plastic film and was dried at room temperature (23° C.±2° C.) for one day to form a base layer with a thickness of about 10 mm to 12 mm. Properties of the resultant base layer sample were then evaluated according to the test methods described above and were reported in Table 1.

Binder-2 was prepared by first mixing Part A and Part B, and then mixing with the EPDM rubber particles based on the formulation described in Table 5. The resultant second polymer mixture was sprayed onto the base layer and formed a top layer with a thickness of about 3 mm. The resultant sample was exposed to dry condition (1 day at 23° C.+1 day at 70° C.+1 day at 23° C.), wherein the sports track sample comprising the base layer and the top layer were peeled off from the plastic film before curing at 70° C. Properties of the resultant sports track sample were then evaluated according to the test methods described above and were reported in Table 1.

Exs 2-12

Base layer samples were prepared according to the same procedure as described in Ex 1, based on the formulations described in Tables 1-4. Top layer samples and sports track samples were prepared according to the same procedure as described in Ex 1, based on the formulation described in Table 5. Base layer samples of Exs 2-12 and sports track samples of Exs 2-5, 7-8 and 10-11 were evaluated according to the test methods described above and were reported in Tables 1-4.

Comparative Example (Comp Ex) A

Binder-1 was prepared by first mixing Part A and Part B, and then mixing with the waste tire rubber particles based on the formulation described in Table 1. The resultant first polymer mixture was then casted onto a plastic film and was dried at room temperature (23° C.±2° C.) for one day to form a base layer with a thickness of about 10 mm to 12 mm. Properties of the resultant base layer sample were then evaluated according to the test methods described above and were reported in Table 1.

Binder-2 was prepared by first mixing Part A and Part B, and then mixing with the EPDM rubber particles based on the formulation described in Table 5. The resultant second polymer mixture was sprayed onto the base layer and formed a top layer with a thickness of about 3 mm. The resultant sample was exposed to dry condition (1 day at 23° C.+1 day at 70° C.+1 day at 23° C.), wherein the sports track sample comprising the base layer and the top layer were peeled off from the plastic film before curing at 70° C. Properties of the resultant sports track sample were then evaluated according to the test methods described above and were reported in Table 1.

Comp Exs B-D

Base layer samples were prepared according to the same procedure as described in Comp Ex A, based on the formulations described in Tables 2-4. Top layer samples and sports track samples were prepared according to the same procedure as described in Comp Ex A, based on the formulation described in Table 5. Base layer samples and sports track samples were evaluated according to the test methods described above and were reported in Tables 2-4.

TABLE 1

| | | Materials | Ex 1 | Ex 2 | Comp Ex A |
|---|---|---|---|---|---|
| Binder | Part A | Polymer 1 latex | 25.00 grams (g) | 25.00 g | 25.00 g |
| | | Polymer 2 latex | 75.00 g | 75.00 g | 75.00 g |
| | | NOPCO NXZ | 0.20 g | 0.20 g | 0.20 g |
| | | ACRYSOL ™ RM-8W | 0.15 g | 0.15 g | 0.15 g |
| | Part B | BAYHYDUR XP 2655E | 3.00 g | 3.00 g | 3.00 g |
| | | COATOSIL 2287 | 2.00 g | 2.00 g | 2.00 g |
| | Part C | Waste tire rubber particles (1-3 mm) | 390.00 g | 355.00 g | 400.00 g |
| | | Coconut shell fibers (1-2 mm) | 10.00 g | 45.00 g | |
| | | Properties of base layer samples | | | |
| | | Tensile strength, MPa | 0.147 | 0.091 | 0.166 |
| | | Elongation at break, % | 13.44 | 10.24 | 13.68 |
| | | Drying residual ratio, % | 80 | 15 | 95 |

TABLE 1-continued

| Materials | Ex 1 | Ex 2 | Comp Ex A |
|---|---|---|---|
| Properties of running track samples | | | |
| Tensile strength, MPa | 0.239 | 0.184 | 0.263 |
| Elongation at break, % | 17.66 | 16.83 | 19.92 |
| Pull-off strength at break, MPa | 0.177 | 0.125 | 0.212 |

TABLE 2

| Materials | | | Ex 3 | Ex 4 | Ex 5 | Ex 6 | Comp Ex B |
|---|---|---|---|---|---|---|---|
| Binder | Part A | Polymer 1 latex | 25.00 g | 25.00 g | 25.00 g | 25.00 g | 25.00 g |
| | | Polymer 2 latex | 75.00 g | 75.00 g | 75.00 g | 75.00 g | 75.00 g |
| | | NOPCO NXZ | 0.20 g | 0.20 g | 0.20 g | 0.20 g | 0.20 g |
| | | ACRYSOL ™ RM-8W | 0.15 g | 0.15 g | 0.15 g | 0.15 g | 0.15 g |
| | Part B | BAYHYDUR XP 2655E | 3.00 g | 3.00 g | 3.00 g | 3.00 g | 3.00 g |
| | | COATOSIL 2287 | 2.00 g | 2.00 g | 2.00 g | 2.00 g | 2.00 g |
| Part C | | Waste tire rubber particles (1-3 mm) | 226.67 g | 203.33 g | — | 203.33 g | 233.33 g |
| | | Waste tire rubber particles (2-4 mm) | — | — | 203.33 g | — | — |
| | | Coconut shell fibers (1-2 mm) | 6.67 g | 30.00 g | 30.00 g | — | — |
| | | Coconut shell fibers (2-5 mm) | — | — | — | 30.00 g | — |
| Properties of base layer samples | | | | | | | |
| Tensile strength, MPa | | | 0.196 | 0.154 | 0.175 | 0.182 | 0.243 |
| Elongation at break, % | | | 13.36 | 11.68 | 12.24 | 10.48 | 19.23 |
| Drying residual ratio, % | | | 83 | 22 | 17 | 13 | 95 |
| Properties of running track samples | | | | | | | |
| Tensile strength, MPa | | | 0.265 | 0.229 | 0.218 | — | 0.321 |
| Elongation at break, % | | | 19.25 | 18.34 | 19.11 | — | 26.12 |
| Pull-off strength at break, MPa | | | 0.235 | 0.185 | 0.201 | — | 0.293 |

TABLE 3

| Materials | | | Ex 7 | Ex 8 | Ex 9 | Comp Ex C |
|---|---|---|---|---|---|---|
| Binder | Part A | Polymer 1 latex | 50.00 g | 50.00 g | 50.00 g | 50.00 g |
| | | Polymer 2 latex | 50.00 g | 50.00 g | 50.00 g | 50.00 g |
| | | NOPCO NXZ | 0.20 g | 0.20 g | 0.20 g | 0.20 g |
| | | ACRYSOL ™ RM-8W | 0.15 g | 0.15 g | 0.15 g | 0.15 g |
| | Part B | BAYHYDUR XP 2655E | 3.00 g | 3.00 g | 3.00 g | 3.00 g |
| | | COATOSIL 2287 | 2.00 g | 2.00 g | 2.00 g | 2.00 g |
| Part C | | Waste tire rubber particles (1-3 mm) | 226.67 g | 203.33 g | — | 233.33 g |
| | | Waste tire rubber particles (2-4 mm) | — | — | 203.33 g | — |
| | | Coconut shell fibers (1-2 mm) | 6.67 g | 30.00 g | — | — |
| | | Wood fibers (1-2 mm) | — | — | 30.00 g | — |
| Properties of base layer samples | | | | | | |
| Tensile strength, MPa | | | 0.203 | 0.154 | 0.168 | 0.251 |
| Elongation at break, % | | | 12.48 | 11.28 | 11.28 | 18.32 |
| Drying residual ratio, % | | | 80 | 20 | 18 | 95 |
| Properties of running track samples | | | | | | |
| Tensile strength, MPa | | | 0.271 | 0.224 | — | 0.338 |
| Elongation, % | | | 18.21 | 17.93 | — | 25.27 |
| Pull-off strength at break, MPa | | | 0.255 | 0.175 | — | 0.288 |

TABLE 4

| Materials | | | Ex 10 | Ex 11 | Ex 12 | Comp Ex D |
|---|---|---|---|---|---|---|
| Binder | Part A | Polymer 1 latex | 75.00 g | 75.00 g | 75.00 g | 75.00 g |
| | | Polymer 2 latex | 25.00 g | 25.00 g | 25.00 g | 25.00 g |
| | | NOPCO NXZ | 0.20 g | 0.20 g | 0.20 g | 0.20 g |
| | | ACRYSOL™ RM-8W | 0.15 g | 0.15 g | 0.15 g | 0.15 g |
| | Part B | BAYHYDUR XP 2655E | 3.00 g | 3.00 g | 3.00 g | 3.00 g |
| | | COATOSIL 2287 | 2.00 g | 2.00 g | 2.00 g | 2.00 g |
| Part C | | Waste tire rubber particles (1-3 mm) | 226.67 g | 203.33 g | — | 233.33 g |
| | | Waste tire rubber particles (2-4 mm) | — | — | 203.33 g | — |
| | | Coconut shell fibers (1-2 mm) | 6.67 g | 30.00 g | — | — |
| | | Wood Fibers (2-5 mm) | — | — | 30.00 g | — |
| Properties of base layer samples | | | | | | |
| Tensile strength, MPa | | | 0.189 | 0.161 | 0.196 | 0.272 |
| Elongation at break, % | | | 11.6 | 11.04 | 11.68 | 16.21 |
| Drying residual ratio, % | | | 80 | 18 | 14 | 95 |
| Properties of running track samples | | | | | | |
| Tensile strength, MPa | | | 0.271 | 0.224 | — | 0.346 |
| Elongation at break, % | | | 18.21 | 17.93 | — | 24.41 |
| Pull-off strength at break, MPa | | | 0.231 | 0.195 | — | 0.311 |

TABLE 5

| Materials of top layer formulations | | | |
|---|---|---|---|
| Binder | Part A | Polymer 1 latex | 60.00 g |
| | | Polymer 2 latex | 40.00 g |
| | | NOPCO NXZ | 0.20 g |
| | | POLYOX™ WSR301 | 0.15 g |
| | Part B | BAYHYDUR XP2655E | 3.00 g |
| | | COATOSIL 2287 | 2.00 g |
| | Part C | EPDM rubber particles (1-3 mm) | 150.00 g |

2. Analytical Results

Tables 1-4 above summarize the properties of the base layer samples and the running track samples of Exs 1-12 (inventive examples) and Comp Exs A-D (comparative examples) determined according to the test method described above.

Tables 1-4 show that, for the same amount and formulation of Binder and the same amount of Part C of base layers, the base layers made with the polymer mixtures of the present invention demonstrate a lower drying residue ratio than the base layers made using the conventional polymer mixtures in each group (Group 1: Exs 1-2 and Comp Ex A; Group 2: Exs 3-6 and Comp Ex B; Group 3: Exs 7-9 and Comp Ex C; Group 4: Exs 10-12 and Comp Ex D) while the base layers made with the polymer mixtures of the present invention may still maintain the desired and acceptable tensile strength and elongation at break properties.

Tables 1-4 also show that, for the same amount and formulation of Binder and the same amount of Part C of base layers and the same amount and formulation of top layers, the running track samples made with the multilayer articles of the present invention demonstrate the desired and acceptable tensile strength, elongation at break and pull-off strength at break properties in each group (Group 1: Exs 1-2 and Comp Ex A; Group 2: Exs 3-5 and Comp Ex B; Group 3: Exs 7-8 and Comp Ex C; Group 4: Exs 10-11 and Comp Ex D).

What is claimed is:

1. A polymer mixture comprising an aqueous binder composition, vulcanized or crosslinked rubber and fibers, wherein the aqueous binder composition comprises:

(a) a first acrylic emulsion (co)polymer having a glass transition temperature of −5° C. or less, (b) a second acrylic emulsion (co)polymer having a glass transition temperature of at least 15° C., and wherein the vulcanized or crosslinked rubber has a sieve particle size of from 1 mm to 4 mm, and wherein the fibers have a length of from 1 mm to 5 mm and an average diameter of from 5 microns to 10 mm, and are selected from coconut shell fibers, wood fibers, or a mixture thereof.

2. The polymer mixture of claim 1, wherein the weight ratio of total acrylic emulsion (co)polymers to the vulcanized or crosslinked rubber is from 1:7 to 1:2, and wherein the weight ratio of the fibers to the vulcanized or crosslinked rubber is from 1:40 to 1:6.

3. The polymer mixture of claim 2, wherein the weight ratio of total acrylic emulsion (co)polymers to the vulcanized or crosslinked rubber is from 1:6 to 1:3.5, and wherein the weight ratio of the fibers to the vulcanized or crosslinked rubber is from 1:35 to 1:7.5.

4. The polymer mixture of claim 1, wherein the aqueous binder composition comprises from 5 wt % to 95 wt % of the first acrylic emulsion (co)polymer, and from 5 wt % to 95 wt % of the second acrylic emulsion (co)polymer, based on the total weight of the acrylic emulsion (co)polymers.

5. The polymer mixture of claim 1, wherein the first acrylic emulsion (co)polymer and the second acrylic emulsion (co)polymer each comprises as polymerized units, at least one ethylenically unsaturated nonionic monomer, and at least one ethylenically unsaturated monomer having at least one functional group selected from carbonyl, acetoac etate, alkoxysilane, carboxyl, ureido, amide, imide or amino group, or mixtures thereof.

6. A multilayer article comprising (i) a base layer of a dried polymer mixture of claim 1, and (ii) a top layer of a dried top coating composition, wherein the top coating composition comprises an aqueous binder composition and vulcanized or crosslinked rubber, wherein the aqueous binder composition comprises:
  (a) a first acrylic emulsion (co)polymer having a glass transition temperature of −5° C. or less,
  (b) a second acrylic emulsion (co)polymer having a glass transition temperature of at least 15° C., and
  wherein the vulcanized or crosslinked rubber in the top coating composition has a sieve particle size of from 1 mm to 4 mm, and wherein the weight ratio of total acrylic emulsion (co)polymers to the vulcanized or crosslinked rubber is from 1:0.5 to 1:4.

7. The multilayer article of claim 6, wherein the multilayer article has a thickness of at least 10 mm, the volume ratio of the base layer to the multilayer article is from 40% to 95%, and the volume ratio of the top layer to the multilayer article is from 5% to 60%.

8. A method of preparing the multilayer article of claim 6, comprising:
  (1) viding the polymer mixture of claim 1;
  (2) applying the polymer mixture to a substrate;
  (3) drying and curing the polymer mixture to form a base layer;
  (4) providing a top coating composition, wherein the top coating composition comprises an aqueous binder composition and vulcanized or crosslinked rubber, wherein the aqueous binder composition comprises (a) a first acrylic emulsion (co)polymer having a glass transition temperature of −5° C. or less, (b) a second acrylic emulsion (co)polymer having a glass transition temperature of at least 15° C., and wherein the vulcanized or crosslinked rubber in the top coating composition has a sieve particle size of from 1 mm to 4 mm, and wherein the weight ratio of total acrylic emulsion (co)polymers to the vulcanized or crosslinked rubber is from 1:0.5 to 1:4;
  (5) applying the top coating composition to the base layer; and
  (6) drying and curing the top coating composition to form a top layer, such that the base layer resides between the substrate and the top layer.

* * * * *